United States Patent [19]

Muramatu et al.

[11] 3,967,245

[45] June 29, 1976

[54] TRAFFIC SIGNAL CONTROL DEVICE WITH CORE MEMORY

[75] Inventors: Akira Muramatu, Kyoto; Kiyoshi Kawata, Kameoka, both of Japan

[73] Assignee: Omron Tateisi Electronics Co., Japan

[22] Filed: Sept. 14, 1973

[21] Appl. No.: 397,592

Related U.S. Application Data

[63] Continuation-in-part of Ser. No. 121,891, March 8, 1971, abandoned.

[30] Foreign Application Priority Data

Mar. 6, 1970 Japan ................................ 45-19503

[52] U.S. Cl. ................................ 340/172.5; 340/40

[51] Int. Cl.[2] .................... G06F 15/06; G06F 15/48

[58] Field of Search .................... 340/172.5, 35, 40; 445/1

[56] References Cited

UNITED STATES PATENTS

| | | | |
|---|---|---|---|
| 3,252,133 | 5/1966 | Aver, Jr. et al. | 340/35 |
| 3,252,134 | 5/1966 | Aver, Jr. et al. | 340/35 |
| 3,254,324 | 5/1966 | Casciato et al. | 340/172.5 X |
| 3,328,791 | 6/1967 | Casciato | 340/35 X |
| 3,375,494 | 3/1968 | Piening et al. | 340/40 |
| 3,434,115 | 3/1969 | Chomicki | 340/172.5 |
| 3,562,704 | 2/1971 | Iwamoto et al. | 340/40 |

*Primary Examiner*—Gareth D. Shaw
*Assistant Examiner*—John P. Vandenburg
*Attorney, Agent, or Firm*—Craig & Antonelli

[57] ABSTRACT

A traffic signal control device for applying traffic signals for switching signals at a multiplicity of intersections. The traffic signal control device comprises a core memory in which a group of variable data such as steps, elapsed times, a group of fixed data such as step periods, offsets, splits, and a group of instruction data are stored. A timing pulse generating circuit for generating percent pulses, seconds pulses, for varying values of variable data and a control device for incrementing the value of one of the variable data when the value of said one of variable data equals to the value of corresponding fixed data are employed.

11 Claims, 6 Drawing Figures

Figure 1:
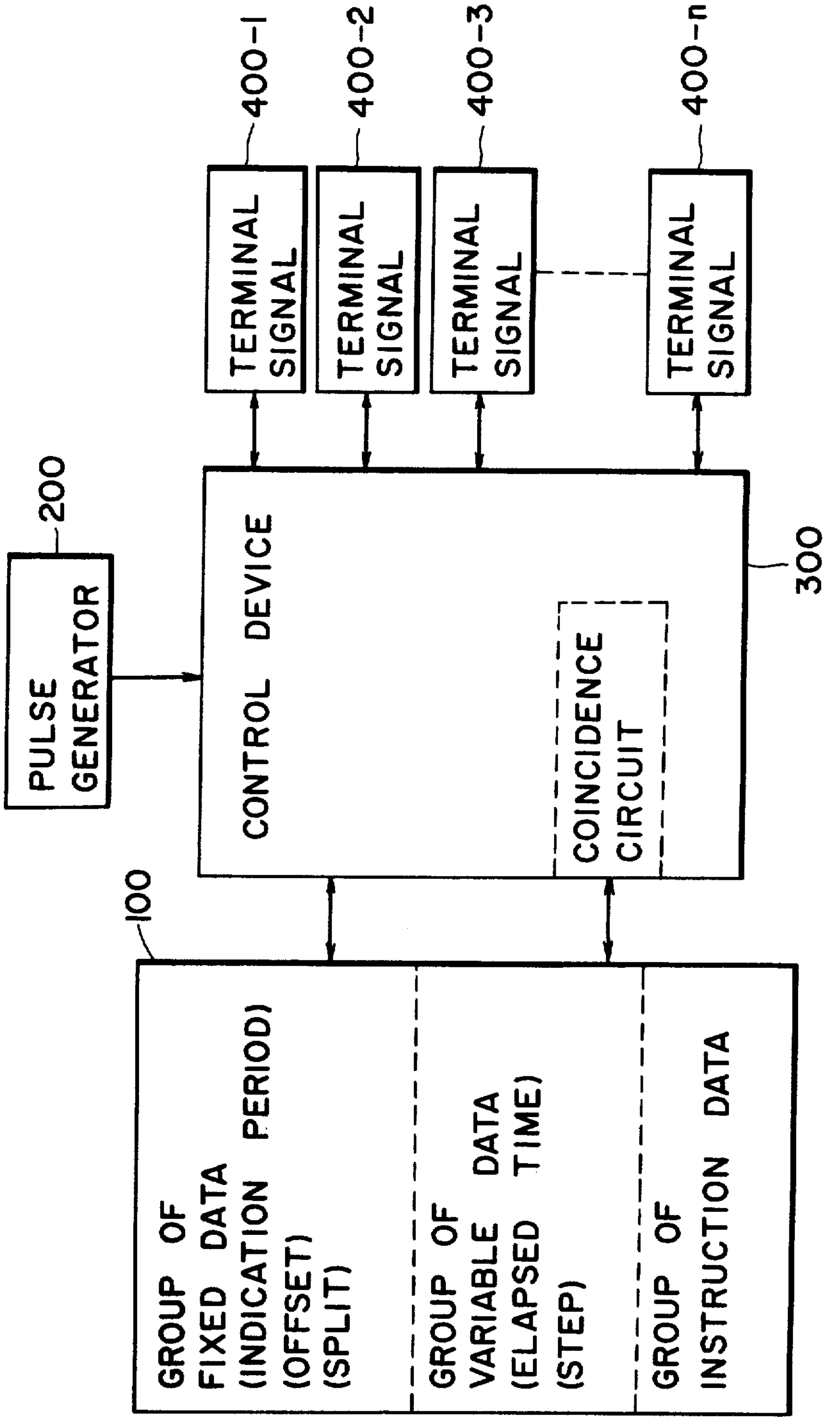

INVENTORS
AKIRA MURAMATU AND
KIYOSHI KAWATA
BY Craig, Antonelli, Stewart & Hill
ATTORNEYS INVENTORS
AKIRA MURAMATU AND
KIYOSHI KAWATA
BY Craig, Antonelli, Stewart & Hill
ATTORNEYS

*Fig. 3*

| INSTRUCTION DATA | | TERMINAL DATA | | | |
|---|---|---|---|---|---|
| ADDRESS | DATA | | | ADDRESS | DATA |
| 000000 | 0001000100 | | 1G | 100000 | |
| 000001 | 0100000001 | | 2G | 100001 | |
| 000010 | 0011000100 | | 3G | 100010 | |
| 000011 | 0001000101 | NO. 1 TERMINAL | 4G | 100011 | |
| 000100 | 0110110000 | | TC | 100100 | |
| 000101 | 0001100000 | | SC | 100101 | |
| 000110 | 1001000100 | | $SC_{MAX}$ | 100110 | 0000000011 |
| 000111 | 1010010000 | | | 100111 | |
| 001000 | 0100110001 | | 1G | 101000 | |
| 001001 | 1100110000 | | 2G | 101001 | |
| 001010 | 1001000110 | | 3G | 101010 | |
| 001011 | 1010001101 | NO. 2 TERMINAL | 4G | 101011 | |
| 001100 | 1110000011 | | TC | 101100 | |
| 001101 | 1100110000 | | SC | 101101 | |
| 001110 | 0011000101 | | $SC_{MAX}$ | 101110 | 0000000011 |
| 001111 | 1111000100 | | | 101111 | |
| 010000 | 0100100001 | | 1G | 110000 | |
| 010001 | 1100100000 | | 2G | 110001 | |
| 010010 | 1000001111 | | 3G | 110010 | |
| 010011 | 1010000000 | NO. 3 TERMINAL | 4G | 110011 | |
| 010100 | 1111111111 | | TC | 110100 | |
| | | | SC | 110101 | |
| | | | $SC_{MAX}$ | 110110 | 0000000011 |
| | | | | 110111 | |
| | | | 1G | 111000 | |
| | | | 2G | 111001 | |
| | | NO. 4 TERMINAL | 3G | 111010 | |
| | | | 4G | 111011 | |
| | | | TC | 111100 | |
| | | | SC | 111101 | |
| 011111 | 0000000011 | | $SC_{MAX}$ | 111110 | 0000000011 |
| | | | | 111111 | |

INVENTORS
AKIRA MURAMATU AND
KIYOSHI KAWATA

BY Craig, Antonelli, Stewart & Hill
ATTORNEYS

TRAFFIC SIGNAL CONTROL DEVICE WITH CORE MEMORY

This is a continuation-in-part of Ser. No. 121,891, filed Mar. 8, 1971, now abandoned.

This invention relates to a traffic signal control device and, especially, to a traffic signal control device for switching traffic signals at a multiplicity of intersections.

A traffic signal control device, which performs centralized control of traffic signals at a multiplicity of intersections, comprises a plurality of terminals, each of which is installed at respective intersections, and a central control device which performs centralized control of these terminals. The central control device performs processing such as prediction of traffic conditions indication of traffic conditions and decisions concerning traffic control patterns by collecting and analyzing the information transmitted from the terminals, and also sends signals to the terminals for switching the control signals at the intersections.

Such a traffic signal control device is advantageous in that the construction of the terminal installed at each respective intersection is quite simple, and the work required for constructing the terminal, as well, as the maintenance and inspection thereof, is simple and, also, traffic flowing over a wide region can be smoothly controlled at one place, namely by one central control device.

On the other hand, since the construction and function of the central control device is much more complicated, it is necessary to attempt not only to minimize the space for the machines constituting the central control device, but also to increase the facility of processing in the central control device.

The present invention has been made in consideration of the above problems, and an object of the present invention is to provide a traffic signal control device which generates signals for switching traffic signals at a multiplicity of intersections, by using a core memory.

Figure 2:
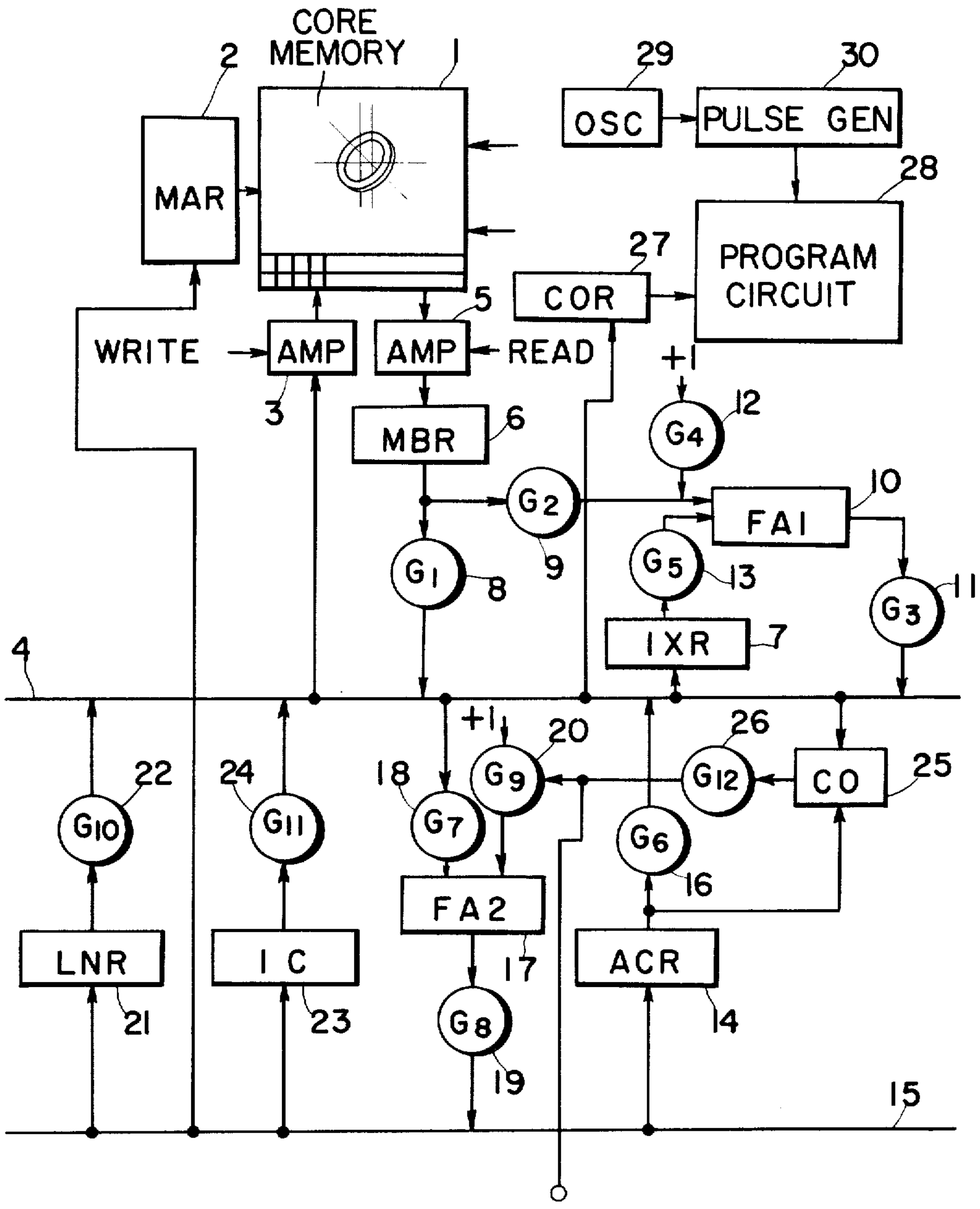
Figure 4:
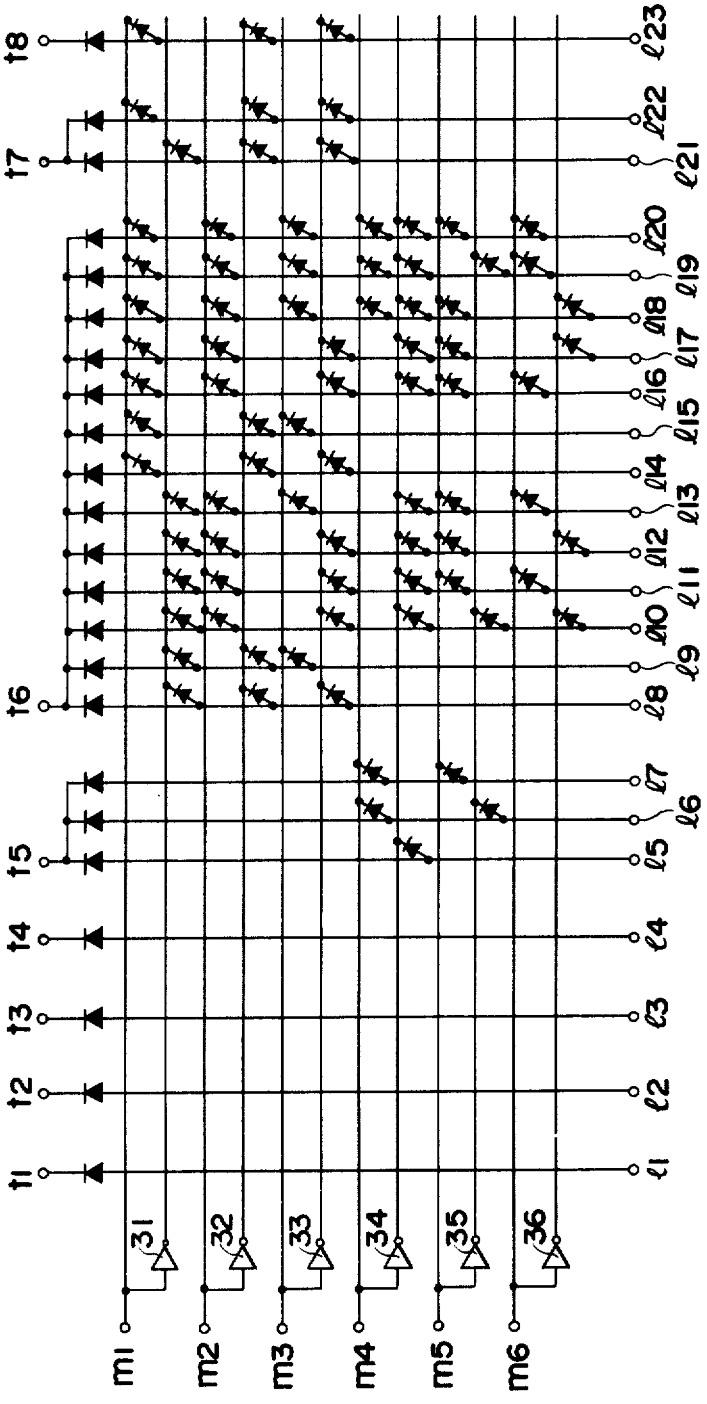
Figure 5:
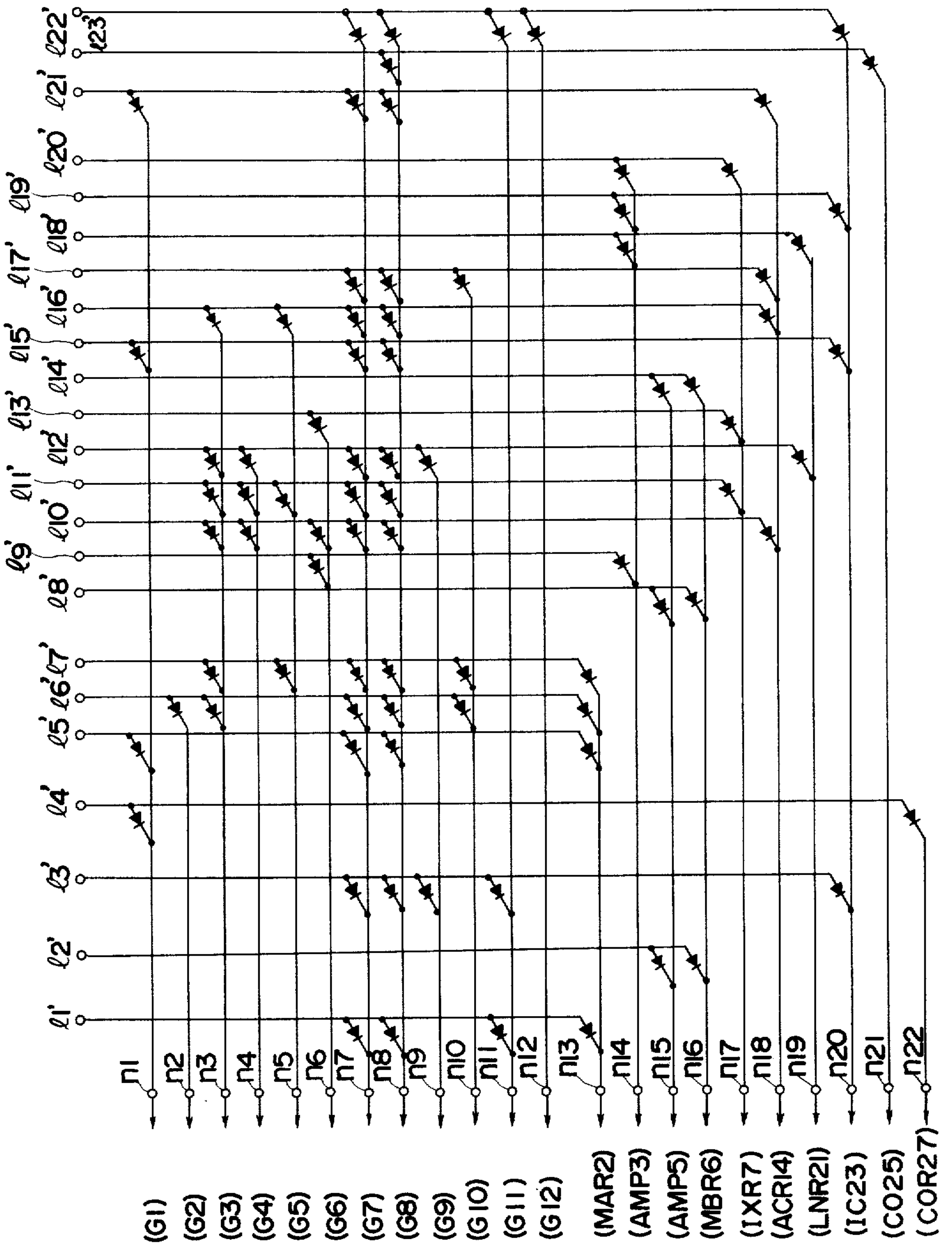
Figure 6:
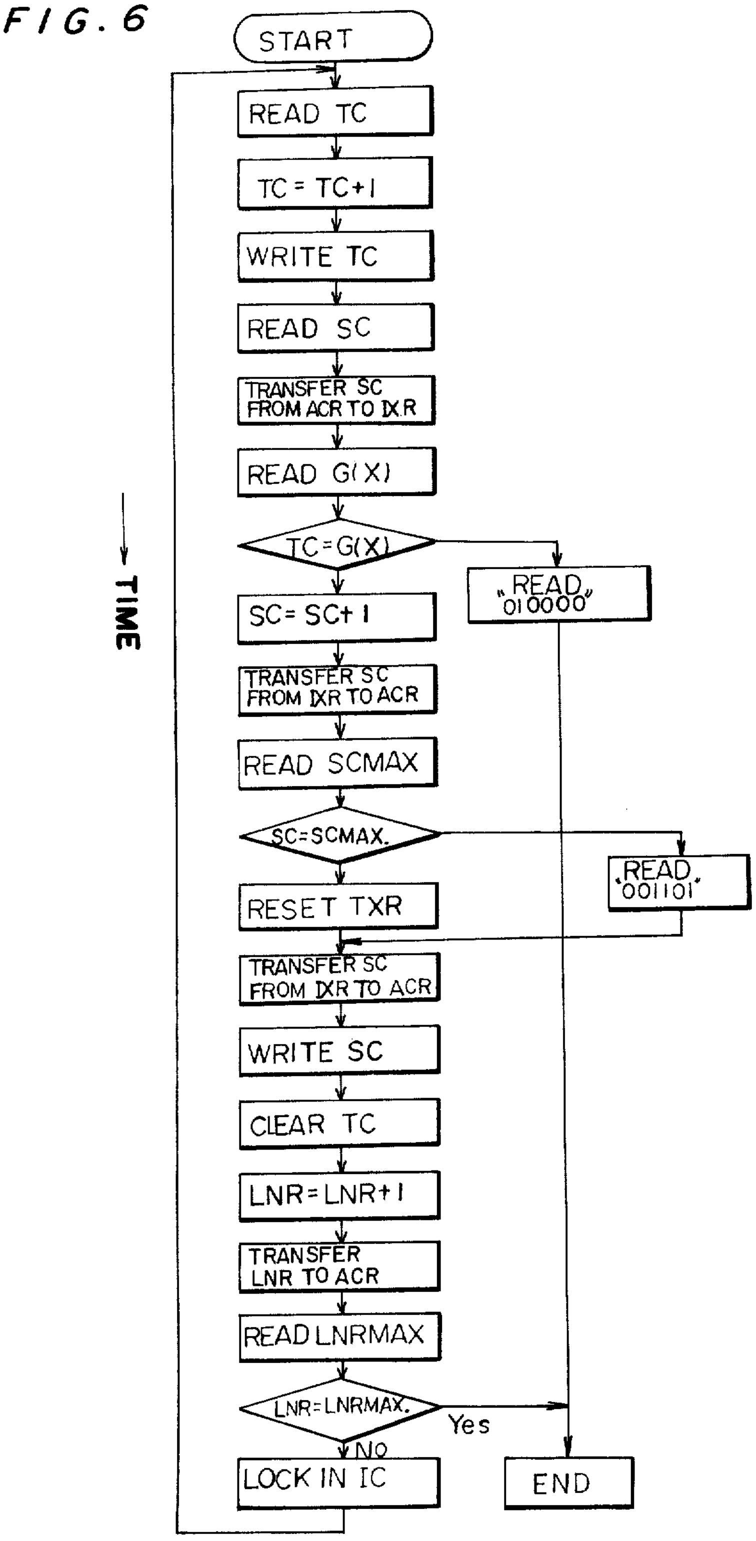

Other objects and advantages of the invention will be apparent from the following description of preferred embodiments of the invention, as illustrated in the accompanying drawings, in which;

FIG. 1 is a block diagram of an embodiment of the invention,

FIG. 2 is a block diagram of an embodiment of the invention used in a fixed period traffic signal control device, FIG. 3 is a graph showing the data stored in core memory shown in FIG. 2, FIG. 4 is a connection diagram of a diode-AND circuit in the program circuit 28 in FIG. 2, FIG. 5 is a connection diagram of a diode-OR circuit in the program circuit 28 in FIG. 2, FIG. 6 is a timing chart, of an operation of the present invention.

As is shown in FIG. 1, a group of fixed data, such as indication periods, offsets and splits, of signals are stored in the GROUP OF FIXED DATA section of a core memory 100, a group of variable data, such as steps, time elapsed from respective certain reference time, are stored in the GROUP OF VARIABLE DATA section of the core memory 100, and a group of instruction data for processing, such as collection of information or decision of control pattern, are stored in the GROUP OF INSTRUCTION DATA section of the core memory 100.

The output signals of a pulse generator 200 are applied to a control device 300 to vary the values of the groups of variable data. Then the values of the groups of variable data are compared to those of the groups of fixed data. Each time when these two kinds of data are coincident to each other, a signal from the control device 300 is applied to one of terminal signals **400-*l* to 400-*n*** for switching a signal at a corresponding intersection.

According to the devices of the present invention, not only the parameters for controlling traffic flows over a wide range of territory can be set at one place, namely, at one central station, but also the parameters can easily be changed.

In the case where the present invention is used in a signal control device with signals of a fixed period, step and time elapsed information from a certain reference time for each terminal are stored in the GROUP OF VARIABLE DATA section of the core memory 100, and an indication period, i.e., a step for each terminal signal is stored in the GROUP OF FIXED DATA section of the core memory 100 and the control device 300 performs, in response to seconds pulses from the pulse generator 200, various control operations in accordance with data stored in the INSTRUCTION DATA section of the core memory 100.

Namely, when a seconds pulse from the pulse generator 200 is applied to the control device 300 at a certain time, i.e. a pulse output provided from the pulse generator 200 at one second intervals, the data stored in the core memory 100, indicating the time elapsed from a certain reference time, are read out by the control device 300 and then the data indicating the elapsed time is incremented by plus one. This incremented data again written in the core memory 100.

Since the data indicating the time elapsed from a certain reference time, and being stored in the core memory 100, is incremented by plus one and is re-written in the core memory 100, at each time when a timing pulse is generated, that portion of the core memory 100 storing the data of elapsed time functions as a time counter.

Then the data, indicating a step, stored in the core memory 100, are read out by the control device 300. After that, the data indicating the indication period of the step at that time are read out, by means of the data indicating the step, by the control device 300, and compared to the data indicating the time elapsed from a certain reference time.

When the data indicating the time elapsed from a certain reference time are coincident with the data indicating the indication period of the step at that time, that is, the indication period of a signal has, at that time, elapsed for a predetermined time, the data indicating the time elapsed from a certain reference time, being stored in the core memory 100, are reset and also the data indicating the step are read out by the control device 300 to be incremented by plus one. The data indicating the step are again written in the core memory 100 after the data are incremented by plus one. At this time, a signal for advancing one step is fed from the control device 300 to a corresponding terminal signal, and as a result, the signal of the corresponding intersection is switched.

In case the present invention is used in a systematic signal control device, data of offsets and splits are stored in the GROUP OF FIXED DATA section of the core memory 100, and percent pulses from the pulse generator 200 are applied to the control device 300. Percent pulses are pulses generated by the pulse generator at intervals which are a percentage such as one percent of a predetermined signal period.

Data are stored in one of the GROUP OF VARIABLE DATA, which are read out, incremented by plus one, and re-written in the core memory 100, in response to each of the percent pulses. Due to the core memory of that portion where these data are stored, the core memory 100 functions as an offset counter and a split counter. Namely, offset and split for each terminal signal are stored in the GROUP OF FIXED DATA section of the core memory 100 at this time, and the data which are to be incremented by plus one, as described above and the data for indicating the offset are read out in response to each of the percent pulses by the control device 300 and are thereby compared to each other. If these two kinds of data are in coincidence, a signal is sent for starting the green-signal period of the corresponding terminal signal. Also, the data indicating time elapsed from a certain reference time, being stored in the GROUP OF VARIABLE DATA section and to be incremented by plus one as described above, and the data indicating the split and being stored in the GROUP OF FIXED DATA section are read out in response to each of the percent pulses, by the control device 300, and are thereby compared to each other. When these two kinds of data are in coincidence, a signal is sent for terminating the green-signal period of the corresponding terminal signal.

Now referring to FIGS. 2 and 3, the invention will be explained more particularly with respect to an embodiment which is used in a fixed period signal control device.

In FIG. 2, reference numeral 1 denotes a core memory. When an address is specified by a memory address register (MAR) 2 containing six bits and a write-in control circuit 3 is driven, then the data conveyed in a first information bus 4 are written in the specified address of the core memory 1. When an address is specified by the address register 2 and a read-out control circuit 5 is driven, the data stored in the specified address of the core memory 1 are read out by a memory bit register (MBR) 6 containing 10 bits.

As illustrated in FIG. 3, instruction data for instructing operations, which will be described hereinafter, are stored in an address section of the core memory, in which each "head" or first bit is indicated by 0, and terminal data are stored in an address section in which each head or first bit is indicated by 1, in the core memory 1.

As for the terminal data, the No. 1 terminal data are stored in an address section, in which each head three bits (first three bits) are indicated by 100, the No. 2 terminal data are stored in an address section, in which each head three bits (first three bits) are indicated by 101, the No. 3 terminal data are stored in an address section, in which each head three bits (first three bits) are indicated by 110 and the No. 4 terminal data are stored in an address section, in which each head three bits (first three bits) are indicated by 111.

In each address section of the terminal data, the time for obtaining right of way for first to fourth passages of the traffic signal terminal is represented by 1G – 4G, respectively. The elapsed time of a first step 1G is set in an address, in which last three bits are indicated by 000, the elapsed time of a second step 2G is set in an address, in which last three bits are indicated by 001, the elapsed time of a third step 3G is set in an address, in which last three bits are indicated by 010, the elapsed time of a fourth step 4G is stored in an address, in which last three bits are indicated by 011, a time counter TC is constituted in an address in which last three bits are indicated by 100, a step counter SC is constituted in an address, in which last three bits are indicated by 101, and the number of the maximum step SC MAX is set in an address, in which last three bits are indicated by 110.

Reference numeral 7 in FIG. 2 denotes an instructions register IXR containing three bits, in which data from a first information bus 4 are stored.

The data stored in the memory register 6 are applied to the first information bus 4, when a first gate circuit (G1) 8 is opened, and are stored in a first full adder (FA1) 10, when a second gate circuit (G2) 9 is opened.

The data stored in the first adder (FA1) 10 are applied to the first information bus 4 when a third gate circuit (G3) 11 is opened. The data stored in the first adder (FA1) 10 through the second gate (G2) 9 are incremented by plus one when a fourth gate circuit (G4) 12 is opened.

The data stored in the IXR register 7 are sent to the first adder (FA1) 10 when a fifth gate circuit (G5) 13 is opened.

Reference numeral 14 denotes an accumulator register ACR containing 10 bits, which applies data to the first information bus 4, when a sixth gate circuit (G6) 16 is opened, after the data has been applied to the ACR register 14 from a second information bus 15. Reference numeral 17 denotes a second full adder (FA2) to which data are applied from the first information bus 4 when a seventh gate circuit (G7) 18 is opened, and applies data to the second information bus 15 when an eighth gate circuit (G8) 19 is opened. The data in the second adder (FA2) 17 are incremented by plus one when a ninth gate circuit (G9) 20 is opened.

Reference numeral 21 denotes a local number register LNR containing three bits, which applies data to the first information bus 4, when an eleventh gate circuit (G11) 24 is opened, after the data has been applied thereto from the second information bus 15. The LNR register 21 specifies the above mentioned terminal addresses.

Reference numeral 23 denoted an instruction counter IC containing six bits, which applies data to the first information bus 4, when an eleventh gate circuit (G11) 24 is opened, after the data has been applied thereto from the second information bus 15. The IC counter 23 specifies the addresses of the above mentioned instruction data successively.

Reference numeral 25 denotes a coincidence circuit (C0), which generates a signal when the data stored in the ACR register 14 coincides with the data applied from the first information bus 4. This signal opens the ninth gate circuit (G9) 20 when a twelveth gate circuit (G12) 26 is opened.

Reference numeral 27 denotes a command register COR containing 10 bits, to which data are applied from the information bus 4, and applies the data to a program circuit 28, which may for example, be a hard-wired program typically consisting of a desired logic arrangement, the construction which is well known to those skilled in the art, for controlling the operation of the system.

Reference numeral 29 denotes a clock pulse generator which generates clock pulses upon the occurrence of a seconds pulse. Reference numeral 30 denotes a timing pulse generator which generates timing pulses in response to a clock pulse.

The first and second information buses 4 and 15 convey ten bits, respectively. The three bits of the LNR register 21 are connected to operate with the fifth (from head) through seventh bits of both the first and second information buses 4 and 15, and the three bits of the IXR register 7 are connected to operate with the eighth through tenth bits of both the first and second information buses 4 and 15, and the ten bits of the memory register 1 are connected, respectively, to operate with each bit of both the first and second information buses 4 and 15, and the six bits of the address register 2 are connected to operate with the last six bits of both the information buses 4 and 15, and the ten bits of the ACR register and COR register are connected, respectively, to operate with each bit of both the first and second information buses 4 and 15.

The timing pulse generator 30 successively generated eight timing pulses in response to one clock pulse. FIG. 4 shows the connection of a diode-AND circuit in the program circuit 28, and FIG. 5 shows the connection of a diode-OR circuit in the program circuit 28. Terminals *l*1 through *l*23 in FIG. 4 are respectively connected to terminals *l*1′ through *l*23′ in FIG. 5. The timing pulses generated by the timing pulse generator 30 are supplied respectively to terminals *t*1 through *t*8 in FIG. 4. Namely, the first timing pulse is supplied to the terminal *t*1, the second timing pulse is supplied to the terminal *t*2, and so on. Reference numerals 31 through 36 respectively denote an inverter. The data stored in the first through sixth bits of the command register COR 27 are applied respectively to terminals *m*1 through *m*6. In FIG. 5, the signals appearing at terminals *n*1 through *n*12 are supplied respectively to the gate circuits (G1) 8, (G2) 9, (G3) 11, (G4) 12, (G5) 13, (G6) 16, (G7) 18, (G8) 19, (G9) 20, (G10) 22, (G11) 24 and (G12) 26 in FIG. 2. Each of these gate circuits is opened by the respective signal appearing at the corresponding terminal as illustrated in FIG. 4. The signals appearing at terminals *n*13 through *n*22 are supplied respectively to the address register (MAR) 2, the write-in control circuit (AMP) 3, the read-out control circuit (AMP) 5, the memory register (MBR) 6, the instruction register (IXR) 7, the accumulator (ACR) 14, the local number register (LNR) 21, the instruction counter (IC) 23, the coincidence circuit (CO) 25 and the command register (COR) 27. Each of these circuits is set by the signal appearing at the corresponding terminal as illustrated in FIG. 5. The program circuit 28 performs successive predetermined operations in response to the first through fourth timing pulses.

Namely, the program circuit 28, in response to the first timing pulse, sets the address register (MAR) 2 and, at the same time, opens the gate circuits (G11) 24, (G7) 18 and (G8) 19. As a result, the data which has been stored in the IC counter 23 is set in the address register (MAR) 2 through the second adder (FA2) 17.

In response to the second timing pulse, the program circuit 28 drives the read-out control circuit 5, and sets the memory register 6. As a result, the data stored in the address specified by the address register (MAR) 2, of the core memory 1 are read out by the memory register (MBR) 6.

In response to the third timing pulse, the program circuit 28 sets the IC counter 23 and opens the eleventh gate circuit (G11) 24, the seventh gate circuit (G7) 18, the ninth gate circuit (G9) 20 and the eighth gate circuit (G8) 19. As a result, the data which have been stored in the IC counter 23 are incremented by plus one by the adder (FA2) 17, and then are stored in the IC counter 23.

In response to the fourth timing pulse, the program circuit 28 opens the first gate circuit (G1) 8 and sets the COR register 27. As a result, the data which have been stored in the memory register 6 are stored in the COR register 27 through the first information bus 4.

In response to the fifth timing pulse, the program circuit 28 performs in accordance with the content of data stored in the COR register 27, operations in three different ways, as described below.

Namely, in case where the content of the fourth bit of the COR register 27 is 0, the program circuit 28 sets the address register (MAR) 2, and at the same time, opens the first gate (G1) 8, the seventh gate (G7) 18 and the eighth gate (G8) 19. As a result, the data which have been stored in the six bits, with the exception of the fourth bit of the memory register 6 are stored in the address register 2 through the second adder (FA2) 17.

In case where the content of the data stored in the COR register 27 is such that the fourth bit is 1, and the fifth bit is 0, the program circuit 28 sets address register (MAR) 2 and, at the same time, opens the tenth gate circuit (G10) 22, the second gate circuit (G2) 9, the third gate circuit (G3) 11, the seventh gate circuit (G7) 18 and the eighth gate circuit (G8) 19. As a result, the data containing six bits, of which the head three bits consist of the data stored in the LNR register 21 and the last three bits consist of the data stored in the memory register 6, are stored in the address register 2.

In case where the content of the data stored in the COR register 27 is such that the fourth bit is 1 and the fifth bit is 1, the program circuit 28 sets the address register 2 and, at the same time, opens the fifth gate circuit (G5) 13, the third gate circuit (G3) 11, the tenth gate circuit (G10) 22, the seventh gate circuit (G7) 18 and the eighth gate circuit (G8) 19. As a result, the data containing six bits, of which head three bits consist of the data stored in the LNR register 21 and the last three bits consist of the data stored in the IXR register 14, are stored in the address register 2.

Upon occurrence of sixth timing pulses and succeeding timing pulses, the program circuit 28 performs, as will be described hereinafter, different operations in accordance with the content stored in the COR register 27.

The instructions data for instructing the different operations are stored in the address section in the core memory 1, each head first bit in the section being indicated by 0.

In case where the head three bits of the data stored in the COR register 27 are 000, the read-out control circuit 5 is driven and, at the same time, the memory register 6 is set upon occurrence of the sixth timing pulse, and the data stored in the specified address in the core memory 1 is read out by the memory register 6. Then, upon occurrence of the seventh timing pulse, the program circuit 28 opens the first gate circuit (G1) 8, the seventh gate circuit (G7) 18 and the eighth gate circuit (G8) 19 and, at the same time, sets the ACR register 14. Thus the data which have been read out by the memory register 6 are stored in the ACR register 14.

In case where the head three bits of the data stored in the COR register 27 are 001, the program circuit 28 opens the sixth gate circuit (G6) 16 and drives the write-in control circuit 3, upon occurrence of the sixth timing pulse. As a result, the data stored in the ACR register 14 are written in the specified address of the core memory 1.

In case where the first three bits of the data stored in the COR register 27 are 010, the program circuit 28 opens, upon occurrence of the sixth timing pulse, the fourth gate circuit (G4) 12, the third gate circuit (G3) 11, the seventh gate circuit (G7) 18 and the eighth gate circuit (G8) 19. Further, in case where the fourth to sixth bits of the data stored in the COR register 27 at this time are 000, the sixth gate circuit 16 is opened and the ACR register 14 is set, and in case where the above three bits are 011, the fifth gate circuit (G5) 13 is opened and the IXR register 7 is set.

In case where the above three bits are 010, the tenth gate circuit (G10) 22 is opened and the LNR register 21 is set. Therefore, in case where the fourth to sixth bits are 000, the data stored in the ACR register 14 are incremented by plus one, and in case where these bits are 011, the data stored in the IXR register 7 are incremented by plus one, and in case where these bits are 010, the data stored in the LNR register 21 are incremented by plus one.

In case where the first three bits of the data stored in the COR register are 011, the program circuit 28 opens the sixth gate circuit (G6) 16 upon occurrence of the sixth timing pulse. At this time, when the fourth to sixth bits of the data are 011, the IXR register 7 is set. Consequently, the data stored in the ACR register 14 are stored in the IXR register 7.

In case where the first three bits of the data stored in the COR register are 100, the read-out control circuit 5 is driven and the memory register 6 is set upon occurrence of the sixth timing pulse, and then the first gate circuit (G1) 8 is opened and the coincidence circuit 25 is set upon occurrence of the seventh timing pulse, and the eleventh gate circuit (G11) 24, the seventh gate circuit (G7) 18, the twelfth gate circuit (G12) 26 and the eighth gate circuit (G8) 19 are opened, and the IC counter is set, upon occurrence of the eighth timing pulse. Therefore, upon occurrence of the sixth timing pulse, the data stored in the specified address of the core memory 1 is read out by the memory register 6, and upon occurrence of the seventh timing pulse, the data stored in the ACR register 14 and the data read out by the memory register 6 are set in the coincidence circuit 25. If these two kinds of the data coincide, the coincidence circuit 25 generates a signal. Upon occurrence of the eighth timing pulse, the gate circuit 9 is opened in response to the output signal from the coincidence circuit 25 and the data which have been stored in the IC counter 23 are incremented by plus one, and are again stored in the IC counter 23.

In case where the first three bits of the data stored in the COR register 27 are 101, the first gate circuit (G1) 8, the seventh gate circuit (G7) 18 and the eighth gate circuit (G8) 19 are opened, the IC counter 23 is set and the last six bits of the data read out by the memory register 6 are stored in the IC counter 23, upon occurrence of the sixth timing pulse.

In case where the first three bits of the data stored in the COR register 27 are 110, the seventh gate circuit (G7) 18 and the eighth gate circuit (G8) 19 are opened and the ACR register 14 is set upon occurrence of the sixth timing pulse.

Further, in case the fourth to sixth bits of the data stored in the COR register 27 are 011 at this time, the fifth gate circuit (G5) 13 and the third gate circuit (G3) 11 are opened, and in case the bits are 010 at this time, the tenth gate circuit (G10) 22 is opened upon occurrence of the sixth timing pulse. Therefore, in case the fourth to sixth bits of the data stored in the COR register 27 are 011, the data which has been stored in the IXR register 7 is stored in the ACR register 14, and if the fourth to sixth bits of the data stored in the COR register 27 are 010, the data which have been stored in the LNR register 21 is stored in the ACR register 14.

In case where the first three bits of the data stored in the COR register 27 are 111 and the fourth bit is 1, the program circuit 28 drives the read-in control circuit 3, and clears the specified address of the core memory 1 upon occurrence of the sixth timing pulse. The program circuit 28 also clears the LNR register 21, the IC counter register 23 or the IXR register 7, respectively, in accordance with the fourth to sixth bits of the data stored in the COR register 27 is 010, 001, or 011.

In case where the first three bits of the data stored in the COR register 27, are 111, and all the other bits are 1, the program circuit 28 resets a flip-flop circuit or a bistable circuit not illustrated in the drawings, which controls the clock pulse generating circuit 29 and the timing pulse generating circuit 30. The bistable circuit is set upon occurrence of a seconds pulse. Signals generated by the timing pulse generating circuit 30 are not applied to the program circuit 28, when the bistable circuit is in reset condition.

Upon occurrence of a seconds pulse, the LNR register 21 is set in the state of 100, and the IXR register 7 and the IC counter 23 are reset.

After this, when the first timing pulse is applied, in response to a clock pulse from the clock pulse generating circuit 29, to the program circuit 28, the eleventh gate circuit (G11) 24, the seventh gate circuit (G7) 18 and the eighth gate circuit (G8) 19 are opened, and the address register 2 is set, and the data 000000 stored in the IC counter 23 are set in the address register 2 as described above.

Then, upon occurrence of the second timing pulse, the read-in control circuit 3 is driven, and the memory register 6 is set, and the data stored in the address 000000 of the core memory 1 are read out by the memory register 6.

In the address 000000 of the core memory are stored the data 0001000100, as shown in FIG. 3.

Upon occurrence of the third timing pulse, the data 000001 is stored in the IC counter 23. Then, upon occurrence of the fourth timing pulse, the data 0001000100, which have been read out by the memory register 6 upon occurrence of the second timing pulse, are stored in the COR register 27.

Upon occurrence of the fifth timing pulse, the data 100100 is stored in the address register 2, since the fourth bit of the data stored in the COR register 27 is 1 and the fifth bit thereof is 0.

Upon occurrence of the sixth timing pulse, the value of the time counter TC of the first terminal, stored in the address 100100 of the core memory 1, is read out by the memory register 6, since the first three bits of the data stored in the COR register 27 are 000.

Then, upon occurrence of the seventh timing pulse, the value of the time counter TC of the first terminal, which has been read out by the memory register 6, is stored in the ACR register 14, since the first three bits of the data stored in the COR register 27 are 000.

In the above mentioned manner, the value of the time counter TC of the first terminal is, after the first clock pulse is generated, stored in the ACR register. Then, after the eighth timing pulse is generated, a second clock pulse is generated. The timing pulse generator 30 then again successively generates eight timing pulses. When the first timing pulse then generated is applied to the program circuit 28 at this time, the data 000001, which have been stored in the IC counter 23, are stored in the address register 2.

Upon occurrence of the second timing pulse, the data 0100000001, are stored in the address 000001 of the core memory 1, and are read out by the memory register 6. Upon occurrence of the third timing pulse, the data 000010 is stored in the IC counter 23. Upon occurrence of the fourth timing pulse, the data 0100000001 are stored in the COR register 27.

Upon occurrence of the fifth timing pulse, the data 000001 are stored in the address register 2, since the fourth bit of the data stored in the COR register 27 is 0.

Upon occurrence of the sixth timing pulse, the sixth gate circuit (G6) 16, the seventh gate circuit (G7) 18, the ninth gate circuit (G9) 20 and the eighth gate circuit (G8) 19 are opened, and the ACR register is set, and the value of the time counter TC of the first terminal stored in the ACR register is incremented by plus one, since the first three bits of the data stored in the COR register are 010 and the fourth to sixth bits are 000.

After the seventh and eighth timing pulses are generated, a third clock pulse is generated, and the first timing pulse than generated is applied to the program circuit 28. At this time the data 000010, which have been stored in the IC counter 23, are stored in the address register 2.

After this, upon occurrence of the second timing pulse, the data 0011000100, stored in the address 0000010 of the core memory 1, are read out by the memory register 6.

Upon occurrence of the third timing pulse, the data 000011 are stored in the IC counter 23.

Upon occurrence of the fourth timing pulse, the data 0011000100, which have been stored in the memory register 6, are stored in the COR register 27.

Upon occurrence of the fifth timing pulse, the data 100100 are stored in the address register 2, since the fourth bit of the data stored in the COR register is 1.

Upon occurrence of the sixth timing pulse, the data 100100 are stored in the address register 2, since the fourth bit of the data stored in the COR register 27 is 1.

Upon occurrence of the seventh timing pulse, the write-in control circuit 3 is driven, and the sixth gate circuit (G6) 16 is opened, and the value of the time counter TC of the first terminal stored in the ACR register 14 is written in the address 100100 of the core memory 1, since the first three bits of the data stored in the COR register 27 are 001. In the above mentioned way, the value of the time counter TC of the first terminal, which has been read out upon occurrence of the first clock pulse and has been incremented by plus one upon occurrence of the second clock pulse, is stored in the core memory 1 upon occurrence of the third clock pulse.

After the seventh and eighth timing pulses have been generated, a fourth clock pulse is generated.

Since the data stored in the IC counter 23 are 000011 when the fourth clock pulse is generated, the value of the step counter SC of the first terminal, which has been stored in the address 100101, is stored in the ACR register 14 after the data 0001000101 stored in the address 000011 of the core memory 1 have been read out.

After a fifth clock pulse is generated, the data 0110110000 stored in the address 000100 of the core memory 1 are read out by the memory register 6 and the value of the step counter SC of the first terminal, which has been stored in the ACR register 14, is stored in the IXR register 7, since the data stored in the IC counter 23 is 000100.

After a sixth clock pulse is generated, the data 000101 are stored in the address register 2 upon occurrence of the first timing pulse then generated, and the data 00011000000 are read out by the address register 2 upon occcurrence of the second timing pulse, and the data are stored in the COR register 27 upon occurrence of the fourth timing pulse.

Upon occurrence of the fifth timing pulse, the data containing six bits, the first three bits of which consisted of the data 100 stored in the LNR register 21 and the last three bits of which consisted of the value of the step counter SC of the first terminal stored in the IXR register 7, are stored in the address register 2.

Accordingly, upon occurrence of the sixth timing pulse, the elapsed time in the step of the first terminal at this time is read out by the memory register 6, and upon occurrence of the seventh timing pulse, the elapsed time in the step is stored in the ACR register 14.

After a seventh clock pulse is generated, the data 1001000100, stored in the address 000110 of the core memory 1, are read out by the memory register 6 upon occurrence of the second timing pulse and the data are stored in the COR register 27 upon occurrence of the fourth timing pulse.

Upon occurrence of the fifth timing pulse, the data 100100 are stored in the address register 2, since the fourth bit of the data stored in the COR register 27 is 1 and the fifth bit thereof is 0.

Upon occurrence of the sixth timing pulse, the read-in control circuit 5 is driven, and, at the same time, the memory register 6 is set, thereby the value of the time counter TC of the first terminal, stored in the address 100100 of the core memory 1, is read out by the memory register 6, since the first three bits of the data stored in the COR register 27 are 100.

Upon occurrence of the seventh timing pulse, the first gate (G1) 8 is opened, and the coincidence circuit (C0) 25 is set, and the value of the time counter TC of the first terminal, which has been read out by the memory register 6, is compared to the value of the elapsed time of the step of the first terminal, at this time, stored in the ACR register 14.

Now assume that these two values coincide with each other. Then the coincidence circuit 25 generates a signal.

Accordingly, upon occurrence of the eighth timing pulse, the ninth gate circuit (G9) 20 is opened and plus one is added to the value stored in the IC counter 23.

Thus, the data 001000 are stored in the IC counter 23, since the data stored in the IC counter 23 at the ime when the third timing pulse was generated, after he generation of the seventh clock pulse, was 000111.

After an eighth clock pulse is generated, the data )01000 is stored in the address register 2 upon the ›ccurrence of the first timing pulse. The data )100110001, stored in the address 001000 of the core nemory 1, are read out by the memory register 6 upon ›ccurrence of the second timing pulse, and the data are hen stored in the COR register 27 upon occurrence of he fourth timing pulse.

Then, upon occurrence of the sixth timing pulse, the value of the step counter SC of the first terminal, stored n the ACR register 7 is incremented by plus one, since he first three bits of the data stored in the COR register 27 are 010 and the fourth to sixth bits are 010.

After a ninth clock pulse is generated, the data )01001, which have been stored in the IC counter 23, s stored in the address register 2 upon occurrence of he first timing pulse, and the data 1100110000, stored n the address 001001 of the core memory 1, are read-out by the memory register 6 upon occurrence of the second timing pulse.

Upon occurrence of the sixth timing pulse, the value of the step counter SC of the first terminal, which has been stored in the IXR register 7, is stored in the ACR register 14, since the first three bits of the data stored in the COR register 27 are 110 and the fourth to sixth bits are 011.

After the tenth clock pulse is generated, the data 001010 stored in the IC counter 23, is set in the address register 2 upon occurrence of the first timing pulse, and the data 1001000110, stored in the address 001010 of the core memory 1, are read out by the memory register 6 upon occurrence of the second timing pulse and then stored in the COR register 27 upon occurrence of the fourth timing pulse.

Thereafter, upon occurrence of the fifth timing pulse, the data 100110 are set in the address register 2, since the fourth bit of the data stored in the COR register 27 is 1 and the fifth bit thereof is 0.

Upon occurrence, of the sixth timing pulse, the maximum number of the step, SC MAX, of the first terminal, stored in the address 100110 of the core memory 1, is read out by the address register 2, since the first three bits of the data stored in the COR register 27 are 100.

Upon occurrence of the seventh timing pulse, the first gate circuit (G1) 8 is opened, and the coincidence circuit 25 is set, thereby the value of the step SC of the first terminal, stored in the ACR register 14, is compared to the maximum number of the step, SC MAX, of the first terminal, which has been read out by the memory register 6.

When these two values coincide with each other, the coincidence circuit 25 generates a signal. Accordingly, upon occurrence of the eighth timing pulse, the data 001011 which had been stored in the IC counter, 23 are incremented by plus one by the adder (FA2) 17, and then the data 001100 are stored in the IC counter 23.

After an eleventh clock pulse is generated, the data 001100 are stored in the address register 2 upon occurrence of the first timing pulse, and the data 1100000011, stored in the address 001100 of the core memory 1, are read out by the memory register 6 upon occcurrence of the second timing pulse. This data is stored in the COR register 27 upon occurrence of the fourth timing pulse.

When the fifth timing pulse is generated, the fourth bit of the data stored in the COR register 27 is 0.

Upon occurrence of the sixth timing pulse, the IXR register 7 is reset, since the first three bits of the data stored in the COR register 27 are 111 fourth bit is 1, and the last three bits are 011.

After a twelfth clock is generated, the data 001101 which have been stored in the IC counter 23 are stored in the address register 2 upon occurrence of the first timing pulse, and the data 1100110000 stored in the address 001101 of the core memory 1 are read out by the memory register 6 upon occurrence of the second timing pulse. When the sixth timing pulse is generated, the value of the step counter SC of the first terminal, which has been stored in the IXR register 7, is stored in the ACR register 14, since the first three bits of the data stored in the COR register 27 are 110 and the fourth to sixth bits are 011.

After a thirteenth clock pulse is generated, the data 001110 which have been stored in the IC counter 23, are stored in the address register 2 upon occurrence of the first timing pulse, and the data 0011000101 stored in the address 001110 of the memory 1 are read out by the memory register 6 upon occurrence of the second timing pulse, and then are stored in the COR register 27 upon occurrence of the fourth timing pulse.

When the fifth timing pulse is generated, the data 100101 are stored in the address register 2, since the fourth bit of the data stored in the COR register 27 is 1 and the fifth bit is 0. Then, upon occurrence of the sixth timing pulse, the value of the step counter SC of the first terminal, stored in the ACR register 14, is written in the address 100101 of the core memory 1.

After a fourteenth clock pulse is generated, the data 001111, which have been stored in the IC counter 23, are stored in the address register 2 upon occurrence of the first timing pulse, and the data 1111000100, stored in the address 001111 of the core memory 1, are read out by the memory register 6 upon occurrence of the second timing pulse, and then are stored in the COR register 27 upon occurrence of the fourth timing pulse.

When the fifth timing pulse is generated, the data 100100 are stored in the address register 2, since the fourth bit of the data stored in the COR register 27 is 1 and the fifth bit thereof is 0. When the sixth timing pulse is generated, the write-in control circuit 3 is driven and the time counter TC of the first terminal, stored in the address 100100, is cleared, since the fifth bit of the data stored in the COR register 27 is 1.

Further, a step advance signal is generated by the program circuit 28 upon generation of the seventh timing pulse, since a signal from the COR register 27 has been applied to the program circuit 28, owing to the first three bits of the COR register 27 being 111. At this time, the step advance signal is applied to the first terminal, because the data stored in the LNR register 21 had been 100.

After a fifteenth clock pulse is generated, the data 010001 which had been stored in the IC counter 23, are stored in the address register 2 upon occurrence of the first timing pulse and the data 0100100001 stored in the address 010001 of the core memory 1 are read out by the address register (MBR) 6 upon occurrence of the second timing pulse, and are then stored in the COR register 27 upon occurrence of the fourth timing pulse.

The data 100, stored in the LNR register, are incremented upon occurrence of the sixth timing pulse, by plus one, since the first three bits of the data stored in the COR register are 010 and the fourth to sixth bits thereof are 010. This incremented data 101 specifies the second terminal.

On the contrary, in case the coincidence circuit does not generate a signal when the eighth timing pulse is generated after occurrence of the seventh clock pulse, the data 000111 are not changed and are stored in the IC counter 23 as is.

Therefore, the data 000111 are stored in the address register 2 when the first timing pulse is generated after occurrence of the eighth clock pulse, and the data 101010000 stored in the address 000111 of the core memory 1 are read out by the memory register 6 upon occurrence of the second timing pulse, and then are stored in the COR register 27 upon occurrence of the third timing pulse.

When a sixth timing pulse is generated, the first gate circuit (G1) 8, the seventh gate circuit (G7) 18 and the eighth gate circuit (G8) 19 are opened, and the IC counter 23 is set, since the first three bits of the data stored in the COR register 27 are 101 and the last six bits 010000 of the data, which have been stored in the memory register 6 are stored in the IC counter 23. As a result, the data stored in the address 010000 are read out by the memory register 6 when the next clock pulse is generated.

This means that, after the seventh clock pulse is generated, the value of the elapsed time of the step at that time is compared to that of the time counter TC, and, if these two values do not coincide with each other, both the operations for advancing the step of a terminal and clearing the time counter are not performed.

Similarly, after the eleventh clock pulse is generated, the data 001011 are not changed and are stored in the IC counter 23 as is, when the coincidence circuit 25 generates no signal upon occurrence of the eighth timing pulse.

Therefore, after the ninth clock pulse is generated, the data 001011 are stored in the address register 2 upon occurrence of the first timing pulse, and the data 1010001101, stored in the address 001011 of the core memory 1, are read out by the memory register 6 upon occurrence of the second timing pulse, and then are stored in the COR register 27 upon occurrence of the third timing pulse.

When the sixth timing pulse is generated, the last six bits 001101 of the data, which have been stored in the memory register (MBR) 6 are stored in the IC counter 23, because the first three bits of the data stored in the COR register 27 are 101. As a result, the data stored in the address 001101 are read out by the memory register (MBR) 6, when the next clock pulse is generated.

In short, if the value of the step counter SC incremented, after occurrence of the eleventh clock pulse by plus one, is less than the maximum value of the step counter SC MAX of the first terminal, the operation for clearing the IXR register, accordingly, the operation for clearing the step counter SC are not performed.

After the fifteenth clock pulse is generated, the data stored in the LNR register 21 are incremented by plus one, and the data 101 are stored in the LNR register 21. Then a sixteenth clock pulse occurs.

The data 010001, which have been stored in the IC counter 23, are stored in the address register 2 upon occurrence of the first timing pulse, and the data 1100100000 stored in the address 010001 of the core memory 1, are read out by the memory register 6 upon occurrence of the second timing pulse, and then are stored in the COR register 27 upon occurrence of the fourth timing pulse.

When the fifth timing pulse is generated, the data, which have been stored in the LNR register 21, are stored in the ACR register, because the first three bits of the data stored in the COR register 27 are 110 and the fourth to sixth bits are 010.

Then, after a seventeenth clock pulse is generated, the data 010010, which have been stored in the IC counter 23 in the address register 27 upon occurrence of the first timing pulse, and the data 1000011111 are read out by the memory register 6 upon occurrence of the second timing pulse, and then are stored in the COR register 27 upon occurrence of the fourth timing pulse.

When the fifth timing pulse is generated, the fifth to tenth bits 011111 of the data, which have been stored in the COR register 27, are stored in the address register 2, because the fourth bit of the data stored in the COR register 27 is 0 and the fifth bit thereof is 0.

When the sixth timing pulse is generated, the write-in control circuit 5 is driven, and the memory register 6 is set, since the first three bits of the data stored in the COR register 27 are 100, and the maximum terminal number, LNR MAX, stored in the address 011111 of the core memory 1, is read out by the memory register 6.

When the seventh timing pulse is generated, the first gate circuit (G1) 8 is opened, the coincidence circuit C0 is set, and the terminal maximum value LNR MAX, which has been read out by the memory register 6, is compared to the terminal value stored in the ACR register 14 at this time.

Since the data stored in the ACR register 14 are now equal to the data stored in the LNR register 21, that is 101, and the data read out by the memory register 6 are 0000000011, the coincidence circuit 25 generates no signal.

Therefore, as the ninth gate circuit 20 is closed upon occurrence of the eighth timing pulse, the data 010011 are stored in the IC counter 23.

After that, when the first timing pulse is generated in response to an eighteenth clock pulse, the data 010011 are stored in the address register 2, and the data 1010000000 are stored in the memory register 6 upon occurrence of the second timing pulse, and then are stored in the COR register 27 upon occurrence of the fourth timing pulse.

When the sixth timing pulse is generated, the last six bits 000000 of the data, which have been stored in the COR register 27, or in the memory register 6, are stored in the IC counter 23, because the first three bits of the data stored in the COR register 27 are 101.

Therefore, after a nineteenth clock pulse is generated, the data 000000 are therefore stored in the address register 2 upon occurrence of the first timing pulse, and the above described operations are performed with respect to the second terminal.

When the above described operations have been performed respectively with respect to the first to fourth terminal, the data stored in the ACR register 14 at the time of generation of the seventh timing pulse, the seventh timing pulse being generated after the data 1000001111 in the address of 010010 has been read out, are 111. Therefore, the coincidence circuit 25 generates a signal upon occurrence of the seventh timing pulse.

Accordingly, the data 010100 are stored in the IC counter 23 upon occurrence of the eighth timing pulse. As a result, the data 010100 are stored in the address register 2 upon occurrence of the first timing pulse, which is generated in response to the next clock pulse, and the data 1111111111 in the address 010100 of the core memory 1 are read out by the second timing pulse, and then are stored in the COR register upon occurrence of the third timing pulse.

When the sixth timing pulse is generated, the program circuit 28 resets the flip-flop circuit, which controls the clock pulse generating circuit 29 and the timing pulse generating circuit 30, since all the bits of the data stored in the COR register 27 are 1. Accordingly, the timing pulse generating circuit 30 stops generation of the timing pulses.

After the above described operations with respect to each terminal have been finished, the bistable circuit is reset in response to the next seconds pulse and timing pulses generated by the timing pulse generating circuit 30 are again applied to the program circuit 28.

In the above described embodiment of the present invention, step is advanced when the data indicating the elapsed time and the data indicating the step time, each stored in the core memory 1, coincide with each other. However, the data indicating the time may be subtracted from the data indicating the step time.

What we claim is:

1. A traffic signal control device comprising:

a core memory having memory areas for storing digital data in the form of variable data representative of information corresponding to traffic phases and elapsed times, fixed data representative of information corresponding to interval sequences, and instruction data, for controlling traffic signals;

first means, coupled with said core memory, for writing into and reading out from said core memory said digital data;

control means, responsive to said digital data within said memory, for comparing variable data with fixed data and for incrementing the variable data from said memory by a predetermined number upon coincidence of the compared data and for generating first control signals as a result of the coincidence for controlling the traffic signals, said control means including clock pulse generator means for generating clock pulses and command register means, said first means and said command register means being responsive to said clock pulse generating means for reading out instruction data from said core memory and for storing the read out instruction data in the command register means in accordance with the generation of clock pulses; and a program control circuit, coupled with said control means including said command register means, for controlling time occurrence of the operation of said control means in accordance with the instruction data stored in said command register means.

2. A device in accordance with claim 1, wherein said control means includes a pair of data bit conveying paths, for transmitting information to be stored within and read out from said memory.

3. A device in accordance with claim 2, where said command register means includes a first register, connected to one of said conveying paths, for storing in said first register a portion of the instruction data for controlling said program control circuit and said clock pulse generating means includes a timing signal generator, coupled to said program control circuit, for controlling the sequential operation of said program control circuit.

4. A device in accordance with claim 3, further including a memory address register, coupled to said one of said conveying paths, for controlling the selection of a data storage position within said core memory and wherein said first means includes a memory register, coupled to said core memory and one of said conveying paths, for transferring data stored in said memory to said memory register.

5. A device in accordance with claim 4, further including a first gate circuit coupled to the output of said memory register and responsive to said program control circuit for controllably gating the data within said memory register to one of said conveying paths, and further including a second controlled gate circuit, a first adder circuit and a third controlled gate circuit connected in series between the output of said memory register and said conveying paths.

6. A device in accordance with claim 5, further including a fourth controlled gate circuit connected to said first adder circuit for updating the count in said first adder circuit and a first bus register and a fifth gate circuit, connected in series between said conveying paths and said first adder circuit for supplying said first adder circuit with selected bit information from said conveying paths, in response to the operation of said program control circuit.

7. A device in accordance with claim 3, further including a second register and a third register controllably gated between said conveying paths and said first register, each of said second and third registers storing a selected portion of the data in one of said conveying paths, and including sixth and seventh controlled gate circuits connected in series with said second and third registers for reading out the information stored therein in response to signals from said program control circuit.

8. A device in accordance with claim 7, further including a second adder circuit controllably gated to one of said conveying paths for accumulating data therein in response to said program control circuit and a control gate for passing the sum of the data therein to the other of said conveying paths, and also including an eighth control gate circuit for updating the sum of said second adder.

9. A device in accordance with claim 8, further including a fourth register connected to the other of said conveying paths for storing each portion of the data transmitted therein and a comparison circuit connected to the output of said fourth register and to the one of said conveying paths, for supplying an output to said second adder circuit in response to a coincidence of the input applied to said comparison circuit.

10. A device in accordance with claim 9, further including a ninth controlled gate circuit connected to the output of said fourth register for controlling the read out data stored therein to one of said conveying paths, in response to a gating signal from said program control circuit and further including a tenth control gate circuit connected between the output of said comparison circuit and said second adder circuit for supplying the output of said comparison circuit to control said adder circuit in response to a gating signal from said program control circuit.

11. A traffic signal control device according to claim 1, wherein said control means includes means for comparing data representative of elapsed times and data representative of interval sequences and for providing an output signal indicative of coincidence between the compared data, means for incrementing the data representative of elapsed times by a predetermined number in response to the output signal of said comparing means, and means responsive to the incrementing of said data representative of elapsed times by said predetermined numbers for applying an advance step traffic control signal to the traffic signals to switch the signal thereof.

* * * * *